Aug. 14, 1951  H. S. COFFEE  2,564,250
HYDRAULICALLY OPERATED VEHICLE LOADER
Filed Aug. 9, 1948  3 Sheets-Sheet 1

Henry S. Coffee
INVENTOR.

Aug. 14, 1951  H. S. COFFEE  2,564,250
HYDRAULICALLY OPERATED VEHICLE LOADER
Filed Aug. 9, 1948  3 Sheets-Sheet 2
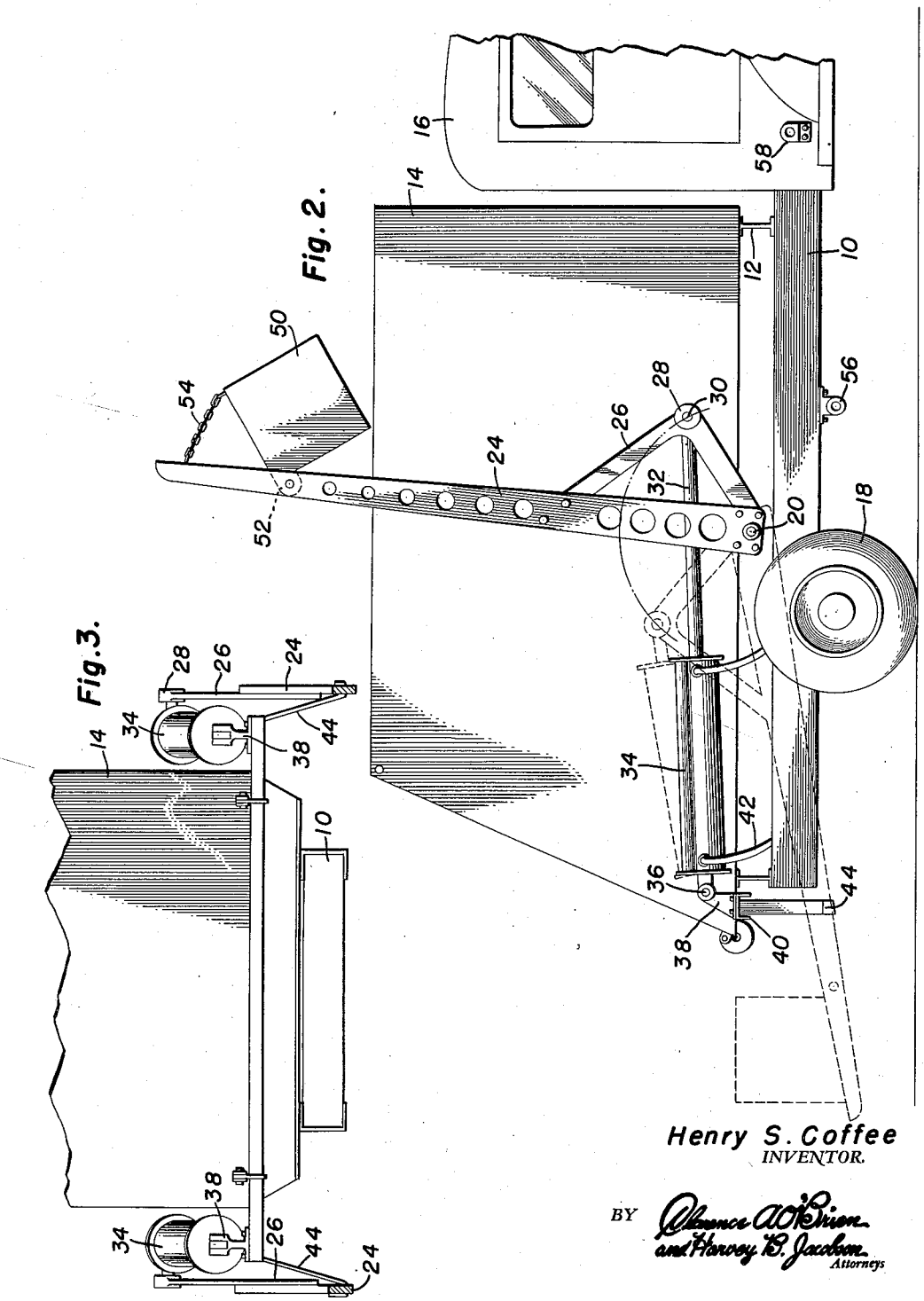
Henry S. Coffee
INVENTOR.
BY Clarence A. O'Brien
and Harvey B. Jacobson
Attorneys Aug. 14, 1951          H. S. COFFEE                2,564,250
                HYDRAULICALLY OPERATED VEHICLE LOADER
Filed Aug. 9, 1948                            3 Sheets-Sheet 3
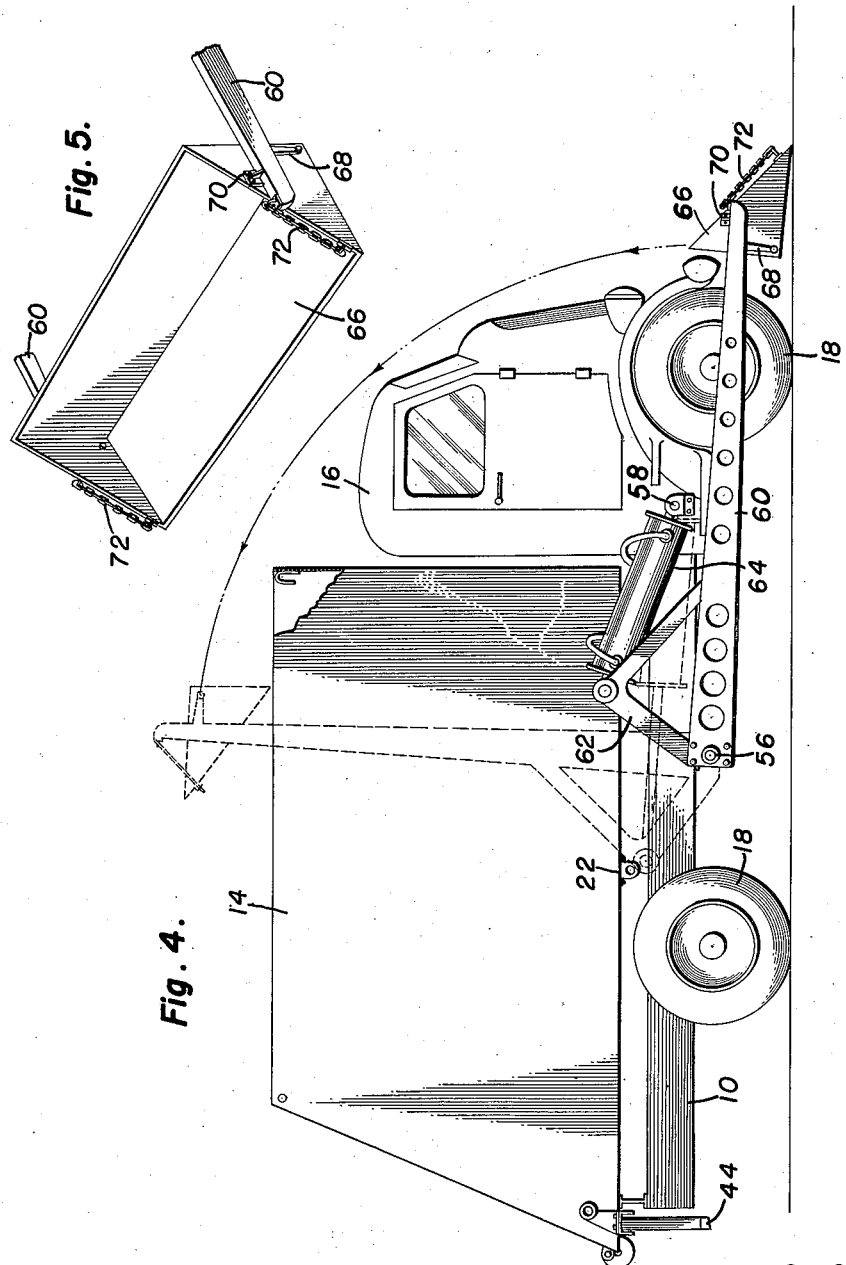
Henry S. Coffee
INVENTOR.

Patented Aug. 14, 1951

2,564,250

UNITED STATES PATENT OFFICE 2,564,250

HYDRAULICALLY OPERATED VEHICLE LOADER

Henry S. Coffee, Salem, Va.

Application August 9, 1948, Serial No. 43,188

3 Claims. (Cl. 214—77)

This invention relates generally to carriers such as trucks and more particularly to a loading device for trucks having boxes and of the general type used for collection of refuse and the like.

A primary object of this invention is to provide a truck loading means which will greatly reduce the cost of manual labor in the loading of such trucks.

Another object of this invention is to provide a truck loading device which is completely satisfactory in use under various conditions, the simple sturdy construction of the device making the same relatively independent of weather conditions and the like.

Still another object of this invention is to provide a loading mechanism in which the actual unloading of a bucket used to elevate material is extremely simple and satisfactory in use.

And a last object of the invention specifically is to provide a device of this general character which is relatively inexpensive and practicable to manufacture, which is safe, simple and convenient to operate, and which will give generally efficient and durable service.

With these objects definitely in view, together with other objects which will appear hereinafter as this description proceeds, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 2 is a side elevational view of the structure illustrated in Figure 1, the above mentioned bucket being raised into the position allowing material carried thereby to be emptied into the truck box;

Figure 3 is a view, largely in elevation but technically a vertical sectional view taken on a line substantially as indicated at 3—3 in Figure 1;

Figure 4 is a side elevational view of a truck with a loading means incorporated therewith, similar to the loading means illustrated in the preceding figures but not identical therewith, the loading means illustrated in Figure 4 being mounted for operation at the front of the truck; and, Figure 5 is enlarged detail view of the bucket and adjacent structure as shown in Figure 4.

Similar characters of reference designate similar or identical elements and portions throughout the specification and throughout the several views in the drawings.

Figure 1:
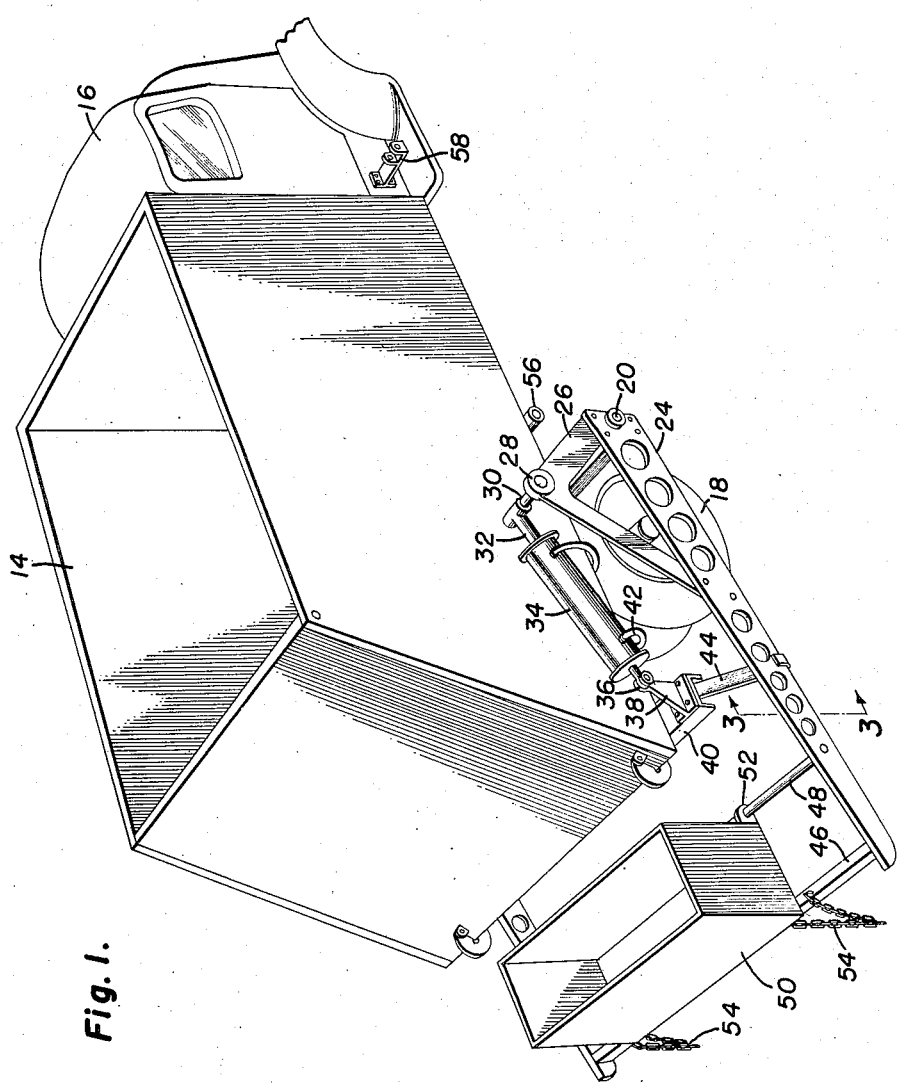
Figure 1 is a three dimensional view of a portion of a truck with this invention incorporated thereon.

Referring now to the drawings in detail, this invention is adapted to be used with an environment including a truck such as that illustrated in the drawings as having longitudinally disposed frame members 10, transversely disposed frame members 12 supporting a box 14, a cab 16, a source of power which is not represented in the drawings and ground contacting wheels 18.

The device includes an elongated member 20 extending transversely of the frame of the truck, ordinarily substantially centrally of the length of the truck and in all cases beneath the box 14, the member being illustrated as supported as at 22 in Figure 4, and the outer ends of the member 20 functioning as journals for the pivotal mounting of the forward ends of the arms 24. These arms are arranged in opposing relation on either side of the truck and these arms are of a length sufficient to extend beyond the rear end of the truck as indicated in the drawings.

Each arm 24 carries an angle member 26, the ends of the member 26 being rigidly secured to the pivoted end of the corresponding arms and the knee portions of the angle members 26 having bearings 28 to receive journals 30 on the end of piston rods 32 associated operatively with a pair of hydraulic cylinders 34 on either side of the truck. The cylinder portions of these hydraulic cylinders 34 are pivotally mounted as indicated at 36 on brackets 38 supported on extensions 40 of fixed structure on the box 14 and are the frame of the truck, and it will be noted that the arms 24 are spaced outwardly from the sides of the truck so that the cylinders 34 operate between the arms and the sides of the box 14. As mentioned above, the truck will have a source of power and will ordinarily have means to provide fluid under pressure which is led to the cylinders 34 through tubes 42, all according to conventional practice.

A pair of hook ended cradles 44 are rigidly secured to the extensions 40, the hook ends being positioned to engage the arms 34 and to limit the downward movement thereof so that the truck may be moved from place to place with the arms extending substantially horizontally toward the rear of the truck.

A cross member 46 is rigidly secured between the outer ends of the arms 24, and another cross member 48 is similarly secured to the arms on the side of the member 46 adjacent to the truck, and a bucket 50 of any suitable shape is pivotally secured, as indicated at 52 on this second cross member 48. It should be carefully noted that the bucket 50 is pivotally secured at one side thereof and that the other side of the bucket will normally rest upon the cross member 46, except when the arms 24 are raised into nearly vertical position. When the arms have been so raised by actuation of the hydraulic cylinders 34, the bucket 50 will be tilted and when the arms reach a position indicated in Figure 2, the bucket will pivot under the force of gravity into the position indicated in that figure, emptying itself of its load into the box 14, and it will also be noted that chains 54 are secured between edge portions of the bucket 50 opposite to the pivotal securement thereof at 52, the other ends of these chains being secured to the fixed cross member 46, so that the pivotal movement of the bucket relative to the arms is limited. By so limiting the movement of the bucket 50, upon return of the arms from the vertical to a position substantially horizontal, the bucket 50 will again assume a position as indicated in Figure 1.

A second supporting means 56 is provided for an elongated pivot member such as that already described and indicated at 20 for use in pivotally mounting a pair of arms 60 for operation at the front of a truck. These arms 60 will be provided with angle members 62 and will be operated by a hydraulic cylinder 64, the one end of which will be removably secured to a bracket 58 rigidly mounted on the frame of the truck, this last mentioned bracket corresponding in function with the already described bracket 38. The arms 60 will carry a bucket 66, preferably triangular in cross section as indicated in Figures 4 and 5, the bucket being pivoted on laterally extending lugs 68 on the arms 60 and a pair of stops 70 will be rigidly mounted on the end panels of the bucket 66 in a position to engage end portions of the arms 60 and to limit pivotal movement of the bucket 66 relative to the arms 60 in one direction. As already described in connection with the bucket 50, a chain 72 will be connected between end portions of the arms 60 and suitable portions of the bucket 66 to limit the movement of the bucket relative to the arms 60 in an opposite direction, the functioning of this portion of the invention being illustrated in dash line in Figure 4.

The operation of this invention will be clearly understood from a consideration of the foregoing description of the mechanical details thereof, taken in connection with the drawings and with the above recitation of the objects sought to be achieved by this invention. In recapitulation, it may be added that the loader when mounted at the front of the truck is particularly useful in the handling of snow, but this invention is not limited to the exact type of bucket nor the material to be handled.

Obviously many minor variations in the details of construction and the proportionment of the various elements of this invention may be resorted to without departure from the spirit of this invention, and the scope of this invention should be limited only as determined by a proper interpretation of the terminology used in the subjoined claims.

Having described the invention, what is claimed as new is:

1. The combination of a truck having power means and a frame, a pair of arms in opposing relation on opposite sides of the truck and pivoted to said frame, said arms being spaced from said sides and having upwardly offset and inwardly projecting journals, hydraulic cylinders operatively connected with said power means and operatively connected between said journals and portions of said frame, a bucket pivotally and transversely mounted on intermediate portions of said arms, and a cross-bar secured to and between said arms and engaging said bucket and preventing movement of the bucket relative to the arms in one direction except when said arms are in nearly vertical position.

2. A combination according to claim 1 and including means to limit the pivotal movement of said bucket in the opposite direction when the arms are in said nearly vertical position.

3. The combination according to claim 2 and including flexible cable elements terminally secured to said cross-bar and to said bucket and limiting the pivotal movement of said bucket in the opposite direction when the arms are in said nearly vertical position.

HENRY S. COFFEE.

REFERENCES CITED

The following references are of record in the file of this patent:

UNITED STATES PATENTS

| Number | Name | Date |
|---|---|---|
| 1,320,970 | Beaty | Nov. 4, 1919 |
| 1,819,578 | Watt | Aug. 18, 1931 |
| 1,865,318 | Howard | June 28, 1932 |
| 2,268,689 | Andrus | Jan. 6, 1942 |
| 2,306,313 | Johnson | Dec. 22, 1942 |
| 2,310,284 | Gurries | Feb. 9, 1943 |
| 2,362,994 | Frost | Nov. 21, 1944 |
| 2,441,591 | Owen | May 18, 1948 |
| 2,457,039 | Graves et al. | Dec. 21, 1948 |
| 2,459,473 | Troutman | Jan. 18, 1949 |
| 2,482,692 | Quales et al. | Sept. 20, 1949 |